Figure 1:
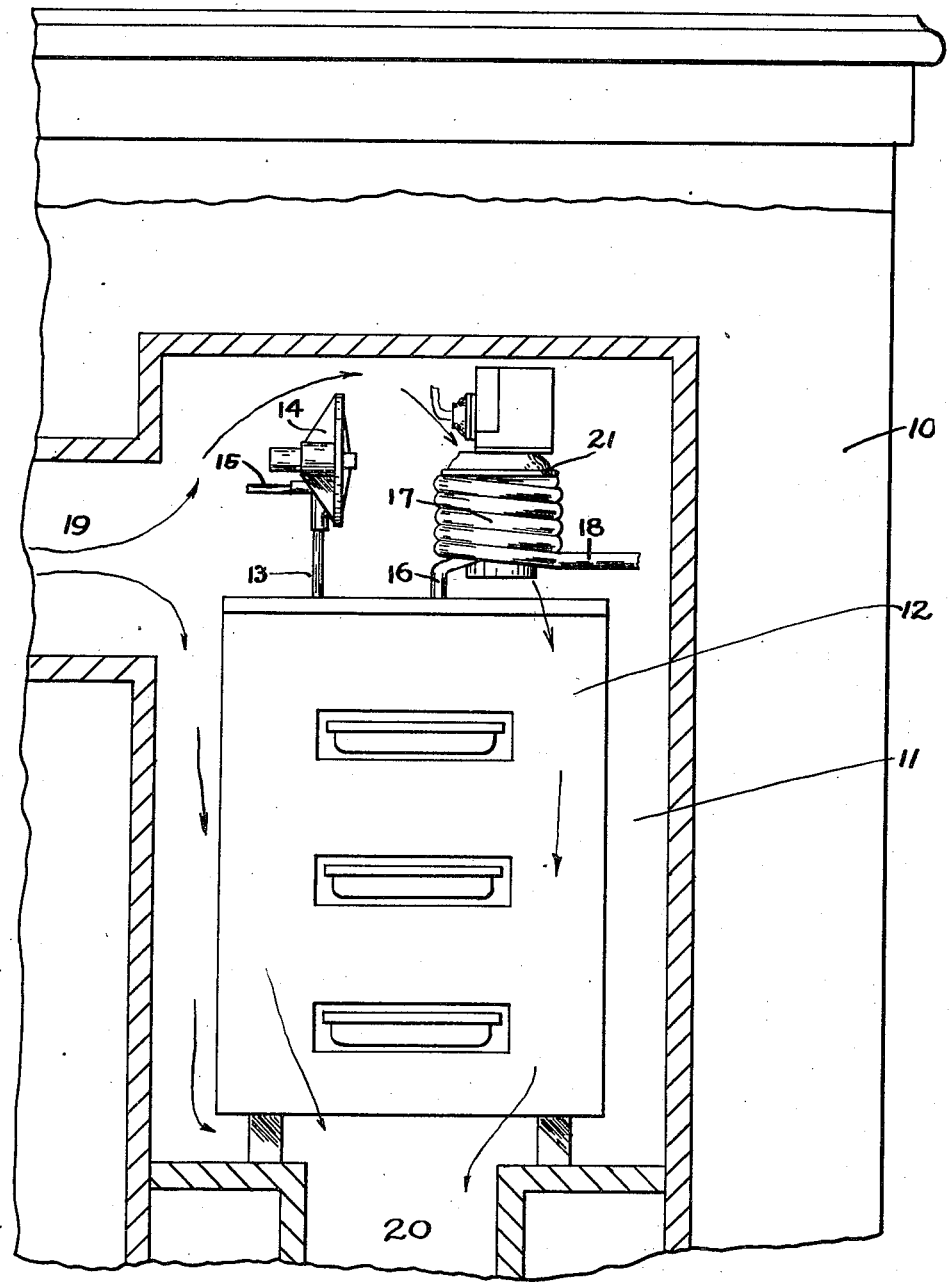

CHARLES C. SPREEN
INVENTOR

Patented Sept. 9, 1924.

1,508,132

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF DELAWARE.

REFRIGERATION.

Application filed July 26, 1923. Serial No. 653,969.

*To all whom it may concern:*

Be it known that I, CHARLES C. SPREEN, a citizen of the United States, residing at Detroit, in the county of Wayne and State of Michigan, have invented a certain new and useful Improvement in Refrigeration, of which the following is a full, clear, and exact description, reference being had to the accompanying drawings.

In artificial refrigerating units wherein an expansion coil is placed within a refrigerator as a substitute for ice, and in a position corresponding operatively to that which would be occupied by ice, experience has shown that the operation of the unit may best be controlled by a thermostat responsive to the temperature of the expanded refrigerant and that this thermostat is best positioned within the cooling chamber and adjacent the expansion coil. Under these circumstances, however, the thermostat is in direct contact with the circulating air and in certain climates and under certain conditions it has been found that this circulating air is so laden with moisture that there is deposited upon the thermostat, and particularly upon the part thereof movable in response to temperature change, an appreciable frost which in many cases interferes with the operation of the movable member and introduces inaccuracies into the control of the unit. My invention provides means for eliminating this deposit of frost upon the movable member.

Figure 2:
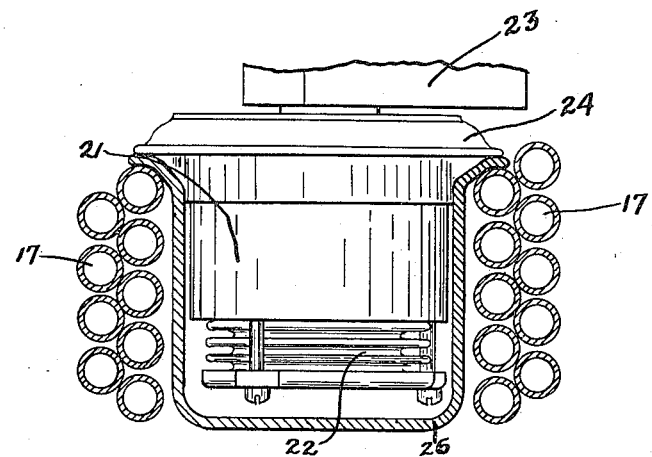
Figure 3:
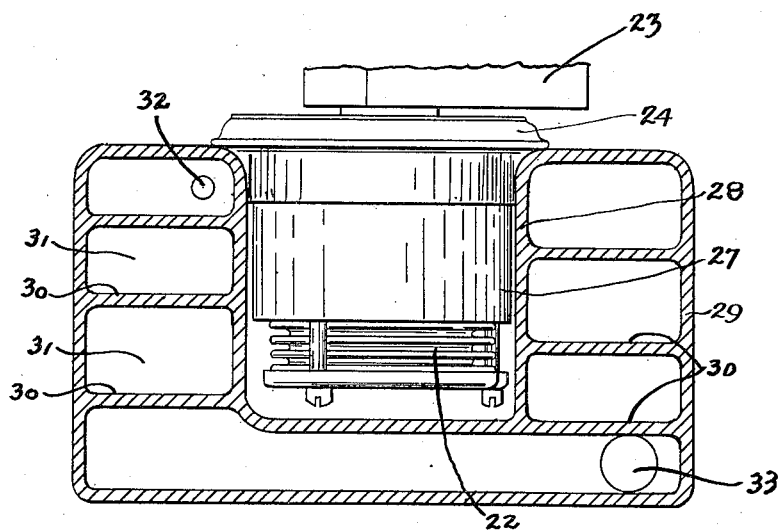

Experience has shown that a refrigerating unit of the type herein considered is best controlled when its action is responsive not only to the temperature of the expanded refrigerant but also in some degree to the temperature of the circulating air as it enters the cooling chamber. At the same time, in many installations the thermostat is made responsive to change in temperature only of the expanded refrigerant. Accordingly I have adapted my invention to both these conditions and in the drawings accompanying this specification and forming a part thereof I have shown, for purposes of illustration, one form of my invention suitable for use under each of these conditions. In these drawings:

Figure 1 is a general view showing the relative position of the thermostat unit and its inter-connection with other parts of the refrigerating unit, Figure 2 is a detail of one form of thermostat unit embodying my invention and designed for use under conditions where response is desired to the combined action of the temperature of the expanded refrigerant and the temperature of the circulating air, while Figure 3 is a detail of one form of thermostat unit embodying my invention and suitable for use where response is desired only to change in temperature of the expanded refrigerant.

In the drawings I have shown a refrigerator 10 provided with a cooling chamber 11 containing a cooling unit 12 comprising suitable passages for the circulation therein of the refrigerant and provided with an inlet 13 communicating through an expansion valve 14 with a duct 15 leading from the outlet of the compressor (not shown) and with an outlet 16 communicating through a thermo coil 17 with a duct 18 leading to the intake of the compressor. It will be apparent from a consideration of Figure 1 that warm air enters the cooling chamber 11 through an opening 19 in the side wall thereof, is cooled by the action of the cooling unit 12, and then passes from the chamber 11 through an opening 20 in the bottom wall thereof, and it will also be apparent that in this flow a portion of the air comes in contact with the thermo coil 17 and with the thermostat unit 21 positioned therein.

The thermostat unit 21 comprises a sylphon 22 mounted upon a plate 24, which carries the various parts of the thermostat, and arranged to expand and contract upon changes in temperature of a suitable gas, such as air, contained therein and to operate, by means of this expansion and contraction, a suitable switch (not shown) contained within a switch housing 23 and arranged to control the action of the compressor motor. In this thermostat unit 21 the plate 24 is arranged to cooperate with a vessel 26 to completely enclose various parts of the thermostat, including the sylphon 22, and thus protect the sylphon from the direct action of the circulating air and subject it only to the action of a heat conducting medium which is positioned within the vessel 26 and is preferably a fluid of such character that it will remain liquid over the range of temperature to which it will be subjected, such as glycerine, a low freezing oil, or a mixture of glycerine and alcohol. The plate 24 and vessel 26 are herein shown as, formed in such proportions and of such sizes as to enter within the thermo coil 17 and be supported therefrom.

The thermostat unit 27 shown in Figure 3 also comprises this thermostat but in the thermostat unit 27 the member acting to support the plate 24, to cooperate with the plate 24 to enclose the sylphon 22 and other parts of the thermostat, and to contain the heat conducting fluid which in the thermostat unit in Figure 2 is contained by the vessel 26, is constructed as a single fixed unit provided with an inner wall 28 arranged to perform the function of the vessel 26 of the thermostat unit 21 and an outer wall 29 and interior walls 30 arranged to cooperate with the inner wall 28 to form a spiral passage 31 adapted to replace the thermo coil 17 of the thermostat unit 21 and provided with suitable inlet and outlet openings 32 and 33 respectively.

It will be apparent from the above disclosure that in both forms of thermostat unit herein disclosed the moving part of the thermostat likely to be undesirably affected by direct contact with the circulating air is protected from that air and that this result is obtained both under the condition wherein the thermostat is to be responsive partly to the temperature of the circulating air and under the condition where the thermostat is to be responsive only to the temperature of the expanded refrigerant. It will be obvious to those skilled in the art that the particular constructions herein shown may be variously modified without departing from the spirit of my invention or sacrificing the advantages thereof and that the disclosure herein is therefore illustrative only and my invention not limited thereto.

I claim:

1. A thermostat comprising a heat conducting vessel, a heat conducting fluid having a negligible co-efficient of expansion at operating temperature and positioned within said vessel, and an element movable in response to change in temperature and immersed in said fluid.

2. A thermostat comprising an element movable in response to change in temperature, a heat conducting vessel completely and substantially hermetically surrounding said element, and a heat conducting fluid having a negligible co-efficient of expansion at operating temperature and positioned within said vessel.

3. A thermostat comprising a heat conducting vessel, a heat conducting fluid having a negligible co-efficient of expansion at operating temperature and positioned within said vessel liquid at the temperature at which said thermostat is designed to operate and an element movable in response to change in temperature and immersed in said fluid.

4. A thermostat comprising an element movable in response to change in temperature, a heat conducting vessel completely and substantially hermetically surrounding said element, and a heat conducting fluid having a negligible co-efficient of expansion at operating temperature and positioned within said vessel liquid at the temperature at which said thermostat is designed to operate.

5. A thermostat comprising a sylphon, a temperature responsive fluid arranged to operate said sylphon, a heat conducting vessel surrounding said sylphon, and a substantially non-temperature responsive heat conducting liquid positioned within said vessel and arranged to conduct heat to and from said temperature responsive fluid.

6. A thermostat comprising a sylphon, a temperature responsive fluid within said sylphon arranged to operate said sylphon, a heat conducting vessel surrounding said sylphon, and a substantially non-temperature responsive heat conducting liquid positioned within the space between said sylphon and said vessel and arranged to conduct heat to and from said temperature responsive fluid.

7. A thermostat comprising a sylphon, a temperature responsive fluid arranged to operate said sylphon, a heat conducting vessel surrounding said sylphon, and a heat conducting fluid having a negligible co-efficient of expansion at operating temperatures positioned within said vessel and arranged to conduct heat to and from said temperature responsive fluid.

8. A thermostat comprising a sylphon, a temperature responsive fluid within said sylphon arranged to operate said sylphon, a heat conducting vessel surrounding said sylphon, and a heat conducting fluid having a negligible co-efficient of expansion at operating temperatures positioned within the space between said sylphon and said vessel and arranged to conduct heat to and from said temperature responsive fluid.

9. A thermostat comprising a sylphon, a temperature responsive fluid within said sylphon arranged to operate said sylphon, a heat conducting vessel surrounding said sylphon, and sealed to said sylphon to form a closed chamber between itself and said sylphon, and a heat conducting fluid having a negligible co-efficient of expansion at operating temperatures positioned within said chamber and arranged to conduct heat to and from said temperature responsive fluid.

In testimony whereof, I hereunto affix my signature.

CHARLES C. SPREEN.